Patented July 24, 1923.

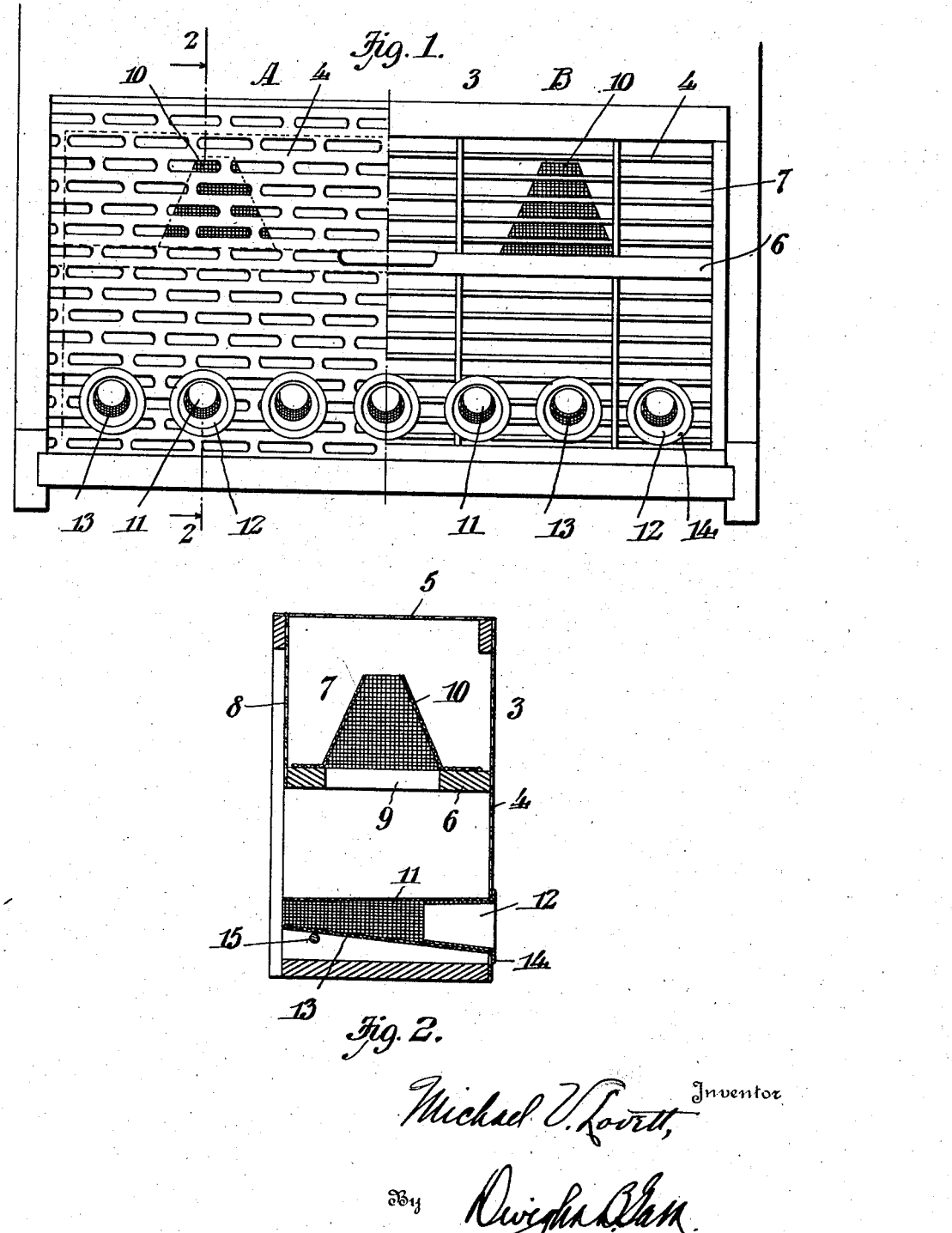

1,462,711

UNITED STATES PATENT OFFICE.

MICHAEL V. LOVETT, OF CASTANEA, PENNSYLVANIA.

ENTRANCE FOR HIVES.

Application filed March 18, 1922. Serial No. 544,792.

*To all whom it may concern:*

Be it known that MICHAEL V. LOVETT, citizen of the United States, residing at Castanea, in the county of Clinton and State of Pennsylvania, has invented certain new and useful Improvements in Entrances for Hives, of which the following is a specification.

This invention relates generally to bee hives, and particularly to queen and drone traps therefor.

The primary object of the invention is to provide means in connection with an entrance device for a bee hive whereby the working bees may readily pass to and from the hive, and whereby upon returning to the hive laden with honey their progress in entering the hive will be unimpeded.

A further object of the invention is to provide a device of the character stated whereby the workers are enabled to yield or produce a greater quantity of honey than has been heretofore possible with other devices of similar nature, and wherein the device is of extremely simple construction, easy and convenient of manufacture, and which will prove highly effective in carrying forth its purposes.

With these and other objects in view, the invention consists of the features of construction, combination and arrangement of parts, hereinafter fully described and claimed, reference being had to the accompanying drawing, in which:—

Figure 1 is a front elevation of a queen and drone trap of conventional type, and illustrating the preferred means for carrying out the invention, and Figure 2 is a transverse sectional view taken substantially upon line 2—2 of Figure 1.

As is generally known to apiarists, the reticulated bodies or walls inserted in front of the hive opening are of such character as to permit of the bees passing freely to and from the hive, and it is also well known that the laden bees coming to the hive are of somewhat greater proportion than at other times. The walls, openings or passages in these walls are usually of such size as to permit of the bees passing readily out of the hive, but offer impediment to the incoming or laden bees; this being necessary in order that the openings, slots or spaces be not sufficiently large to permit the queens or drones escaping from the hive. Due to the difficulty the laden workers experience in passing through these slotted walls, the workers are prevented producing to their maximum.

It is the general purpose of the present invention to provide means whereby this objection is overcome, without incurring danger of escape of the drones or queens.

The invention, in the present instance, is shown as applied to conventional forms of queen and drone traps, such as are familiar to all apiarists. These traps comprise bodies 3 of a breadth sufficient to extend entirely across the front of the hive. The body sits snugly against the hive front so as to cover the entrance to the latter, and is provided with reticulated front and top walls 4 and 5 respectively. The body is divided longitudinally by a floor indicated at 6, the compartment thus provided above the floor constituting a drone or queen compartment 7 closed by a reticulated rear wall 8. The compartment 7 may have openings 9 therein covered by the mesh cones 10, as is generally understood.

In Figure 1 of the drawing, to the left thereof, the section indicated at A indicates a zinc front trap, while at B there is shown a trap having horizontally disposed bars constituting the front wall. The device embodying my invention is adapted to either type of trap, and may be effectively used with other styles of traps or hive guards.

The invention is carried forth by arranging ducts or passages extending inwardly from the forward wall 4 of the trap, such ducts or passages being open at both ends and being of a size sufficient to enable the worker bees freely passing into the trap and so as not to be hindered in such progress. It is preferred that these ducts be of substantially cone shape, the larger ends thereof extending through the forward wall 4 of the trap, while the restricted rear ends are disposed near the inner edge of the trap and in such position that bees passing therefrom may enter the front opening in the hive. These ducts or channels are indicated generally at 11.

As a practical and expedient means of carrying out the invention, these channels may include thimble portions 12 and mesh fabric 13. The thimble portions are of metal and are flanged at their larger ends as at 14 to provide suitable anchoring means for the thimble members. These thimbles are set into the wall 4 near the lower end thereof and may have their flanges 14 soldered or in any other suitable manner affixed to the said wall. The thimbles are surrounded by the rearwardly extending mesh fabric 13, such as screen wire, and the thimbles 12 constitute proper forms for this fabric. The fabric 13 converges at its rear end, but the opening at the rear end is not sufficiently small to offer resistance or obstruction to the incoming laden workers, yet these rear ends are not sufficiently large to permit of the larger queens or drones using the passage as an exit. The rear ends of the cones 11 may be supported by a rod 15 extending throughout the length of the body 3.

Any number of the channels or ducts 11 may be employed, and they are preferably arranged relatively close together near the lower part of the body so as to be located at a point at which the workers usually strive to enter the trap.

It will be noted, furthermore, that the rear ends of the channels or ducts 11 are disposed in a plane slightly above the forward ends thereof, so that the said rear ends will be disposed a substantial distance above the floor or base of body 3. By so arranging the ducts, the rear ends thereof are disposed out of the path of bees passing from the hive into the trap.

From the foregoing it is obvious that I have provided means of an extremely simple nature for carrying forth the objects of the invention, and by the use of a device so constructed it will be at once apparent that the objections pointed out will be overcome. The construction and arrangement of the cone members or ducts 11 herein expressed is merely one means of carrying forth the invention, and it will be understood that variation in the construction, size, disposition and arrangement of such ducts, as well as the materials of which they are constructed, may be resorted to without departing from the invention as defined by the claims.

Having thus fully described my invention, I claim:—

1. In a device of the class described, a reticulated wall, a thimble member of substantially frusto-conical shape anchored in said wall with its larger end disposed therethrough, and a foraminous open ended cone member secured to said thimble at the inner or smaller end thereof and projecting rearwardly from said thimble member.

2. In a device of the class described, a body having an openwork wall, a thimble member of substantially frusto-conical formation having its larger end disposed through said wall, a flange on said larger end resting against said wall, an open ended cone formed of screen material surrounding the inner portion of said thimble and projecting rearwardly therefrom, and a rod supporting the rear end of said cone.

3. The combination with the reticulated outer wall of a bee hive separating the interior from the exterior thereof; of cone members open at both ends arranged in said wall with their larger ends disposed upon the exterior of the wall and the smaller inner ends of the cones disposed interior of said wall.

4. The combination with a queen or drone trap for bee hives having the usual front wall of openwork formation and a drone or queen compartment above; of cone members open at both ends arranged in said wall, the larger open ends of said cone members being disposed upon the outer face of said wall and the inner open ends of said cones disposed interior of the wall.

In testimony whereof he affixes his signature.

MICHAEL V. LOVETT.